United States Patent [19]

Graham et al.

[11] 3,870,071

[45] Mar. 11, 1975

[54] SWING CHECK SEAL ASSEMBLY

[75] Inventors: Donald E. Graham, San Leandro; Larry A. Battaglia, Benicia, both of Calif.

[73] Assignee: Valve Systems International, Inc., Bala Cynwyd, Pa.

[22] Filed: Jan. 16, 1974

[21] Appl. No.: 433,760

[52] U.S. Cl.............. 137/527, 137/527.8, 251/170, 251/174, 251/177
[51] Int. Cl............................................. F16k 15/03
[58] Field of Search ............ 251/366, 367, 174, 176, 251/177, 170; 137/527, 527.2, 527.4, 527.6, 527.8, 375, 268

[56] References Cited
UNITED STATES PATENTS

| | | | |
|---|---|---|---|
| 2,578,590 | 12/1951 | Perrault | 137/527.4 X |
| 3,191,619 | 6/1965 | Allen | 137/527.4 |
| 3,269,695 | 8/1966 | Grove | 251/174 |
| 3,425,662 | 2/1969 | Bryant et al. | 251/176 |
| 3,743,246 | 7/1973 | Heller | 251/367 |

*Primary Examiner*—William R. Cline
*Attorney, Agent, or Firm*—Melvin R. Stidham, Esq.

[57] ABSTRACT

The disclosure is of a swing check valve wherein the valve clapper is a dished spherical section with a conical sealing surface at its periphery engageable with a complementary conical seat surface. There are various seat ring embodiments with means to facilitate the accomodation of the conical surfaces of the clapper and the seat to each other despite some slight misalignments thereof and without an undue amount of play between the clapper shaft and its support.

7 Claims, 7 Drawing Figures

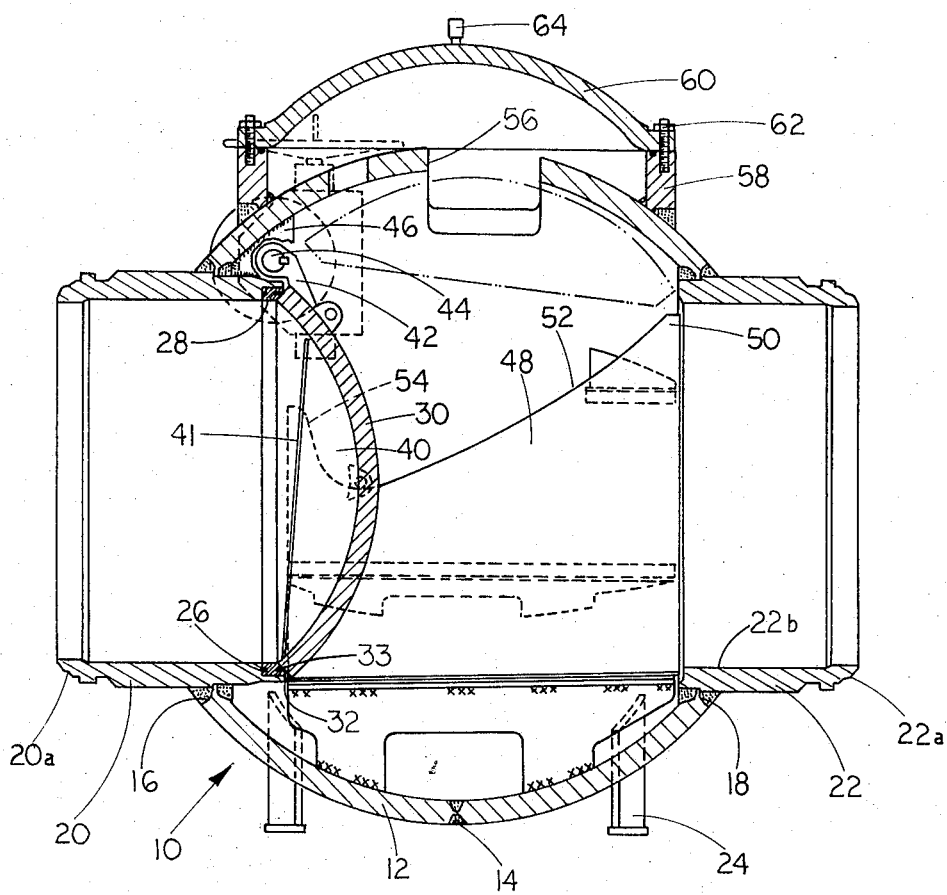
FIG.-1-
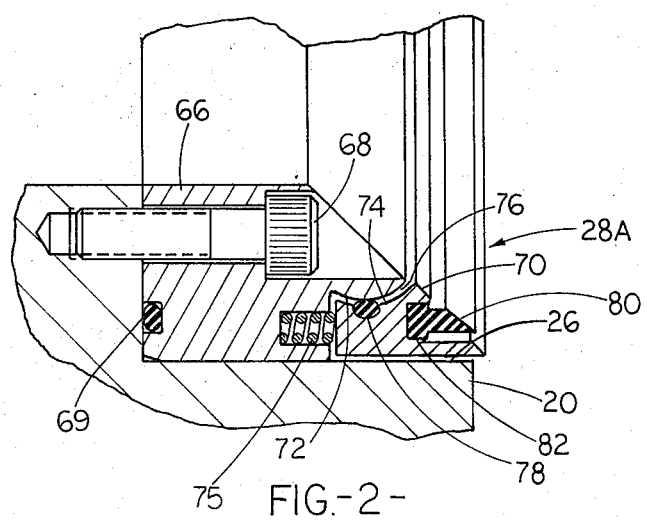
FIG.-2-

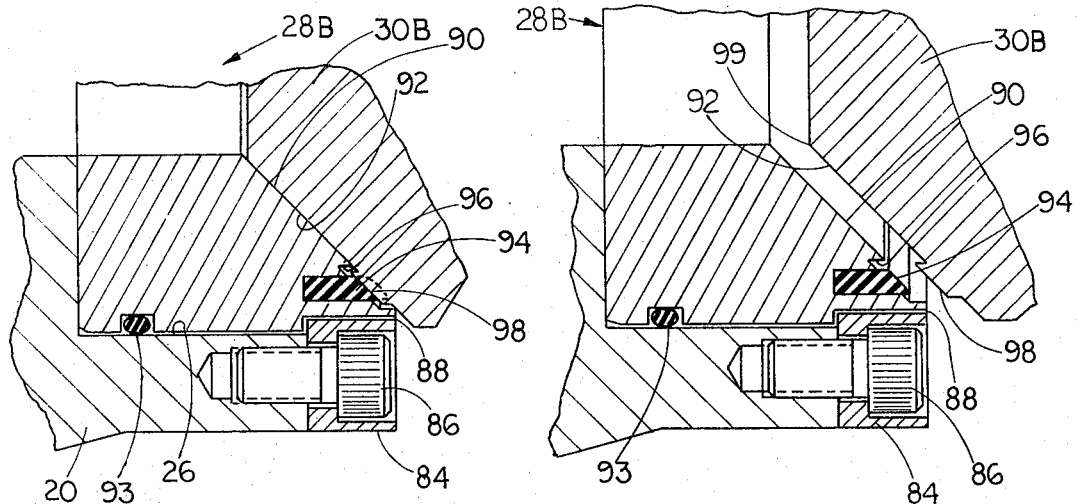
FIG.-3-   FIG.-4-
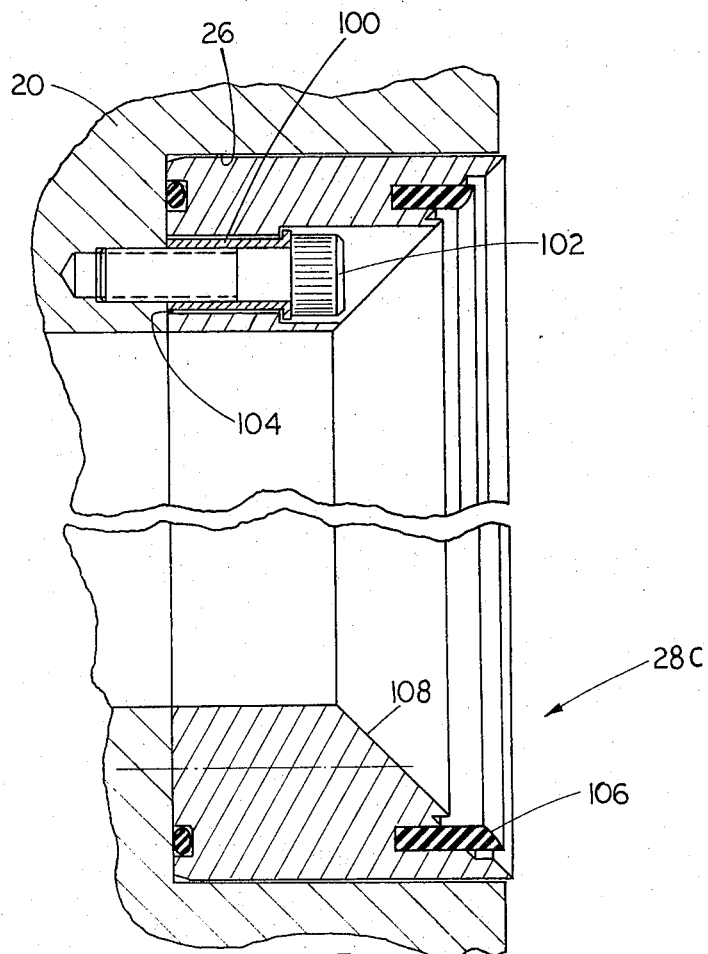
FIG.-5-

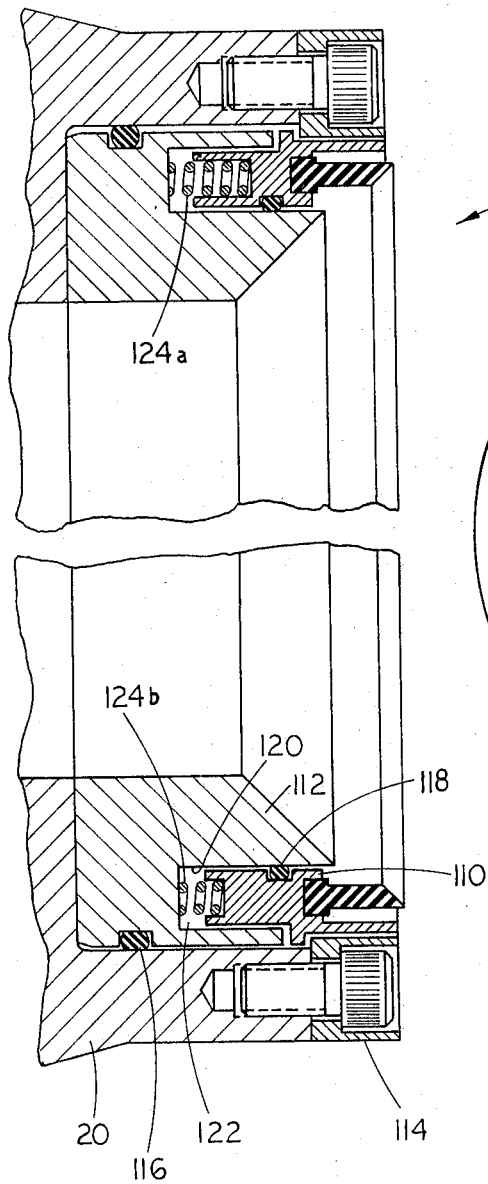
FIG.-6-
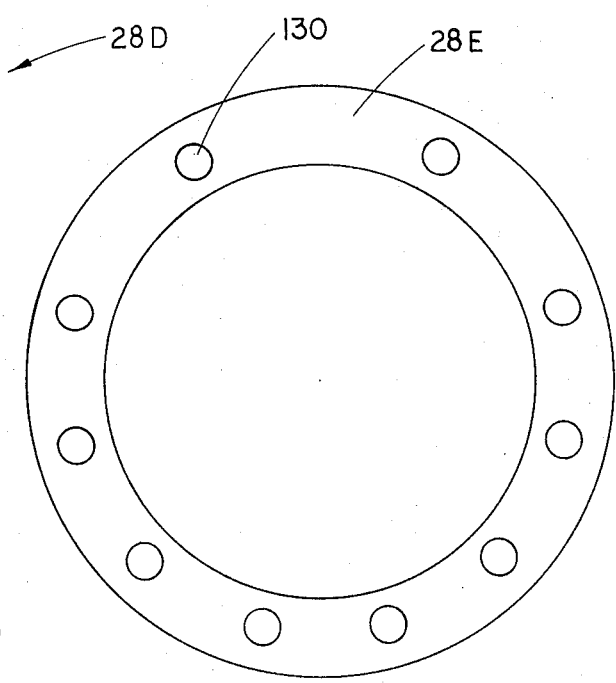
FIG.-7-

SWING CHECK SEAL ASSEMBLY

BACKGROUND OF THE INVENTION

Swing check valves are commonly employed in large pipelines for the purpose of providing virtually unimpeded flow during normal pipeline operation but to check flow effectively in the event of a reversal thereof. For example, such a valve may be placed at the foot of a hill crossing to check flow and prevent environmental contamination in the event of a line break. Generally, a swing check valve clapper will first contact its seat on the body in the area closest to its pivotal axis and, in the event of a low pressure drop across the valve, the clapper may become hung up before it reaches its fully closed position. This and other misalignments of the clapper and seat are commonly avoided by allowing radial play between the clapper shaft and its mounting.

Particularly in the operation of pipelines for the transportation of petroleum products, it is often desirable to transport different fluids over the same pipeline. For example, different weights and grades of lubricating oil and both light and heavy fuel oils may be passed through the pipeline at different times. In order to prevent intermixing the different products, they may be separated physically by introducing a "pig," e.g., a sphere of rubber or the like, into the line so as to be forced along by the flowing fluid in sealing engagement with the inner wall of the pipe. Similarly, pigs may be forced along the pipeline to scrape and clean the walls thereof. In either event, sediment carried along by the pig may score or otherwise damage valve sealing surfaces.

OBJECTS OF THE INVENTION

It is an object of this invention to provide a swing check valve having complementary, conical sealing surfaces on the clapper and on the valve seat.

It is an object of this invention to provide a swing check valve with conical sealing surfaces with means on the valve seat to facilitate accommodation of the conical surfaces to each other.

It is a further object of this invention to provide a swing check valve with means to insure full closing, even at a relatively low pressure differential.

It is a further object of this invention to provide a swing check valve with means to insure full closing without allowing radial play between the clapper shaft and its mounting.

It is a further object of this invention to provide a swing check valve with means for protecting the valve seat against scraping and scoring.

It is a further object of this invention to provide a swing check valve with means to protect the clapper sealing surface against abrasion by a pig passing therethrough.

Other objects and advantages of this invention will become apparent from the description to follow when read in conjunction with the accompanying drawings.

BRIEF SUMMARY OF THE INVENTION

In carrying out this invention, an enlarged main body section is provided with cylindrical hubs which adapt the valve for connection into a pipeline. One of the cylindrical hubs extends into the interior of the body and carries a seat ring thereon for engagement by a complementary sealing surface on a clapper. The clapper is a dished, spherical section and is pivotally mounted about an axis extending transverse to and above the inwardly protruding hub. Because of its spherical configuration, the clapper has its center of gravity displaced from the plane of the seat a sufficient distance to provide a moment arm biasing the clapper into a closed position, even at a low pressure differential.

The sealing edge of the clapper is frusto-conical, generally on a radius of the sphere of which the clapper is a section. Similarly, the body seat ring has a complementary frusto-conical sealing surface. In the event of reverse flow, as in the case of a line break, the clapper swings shut and tends to engage the seat ring first near its pivotal axis, rather than uniformly around the circumference thereof. Accordingly, the seat ring is allowed to shift both radially and axially to accommodate itself to the complementary surface on the clapper and provide uniform sealing, even without radial play between the clapper shaft and its mounting. In certain embodiments, the seat ring is made more yieldable adjacent and pivotal axis to alleviate any tendency to jam the clapper slightly ajar, especially at a low pressure differential, thus providing uniform sealing pressure around the circumference. In one embodiment, the frusto-conical surface of the clapper is provided with a raised seal ring surface which is displaced from the inner diameter of the frusto-conical surface whereby a pig passing through will be cammed away from the surface of the raised seal ring to protect it. Similarly, the resilient seal on the frusto-conical seat is carried in a recess so as not to be infringed upon by a passing pig and/or sediment in the fluid.

BRIEF DESCRIPTION OF THE DRAWINGS

In the drawings:

FIG. 1 is a vertical section view of a swing check valve embodying features of this invention;

FIGS. 2 to 7, inclusive, are enlarged partial section views of various valve seat ring embodiments.

DESCRIPTION OF PREFERRED EMBODIMENTS

Common Subject Matter

Referring now to FIG. 1 with greater particularity, the swing check valve 10 of this invention includes a spherical main body section 12 which may be fabricated from two hemispherical sections which are formed from steel plates or the like and welded together at 14 along the vertical great circle, perpendicular to the axis of the flow passage. The hemispherical sections are formed with upstream and downstream openings 16 and 18 into which upstream and downstream cylindrical hubs 20 and 22 are welded. The hubs shown are finished at their ends 20a and 22a for welding into a pipeline, but it is to be understood that they may be provided with pipeline flanges or any other conventional device for installing the valve 10. Suitable legs 24 may be welded to the spherical section 12 to support the valve erectly, particularly during manufacture and shipping.

As indicated, the upstream hub 20 is somewhat longer than the downstream hub 22 in that it extends into the interior of the spherical main body section 12. An annular recess 26 is formed in the inner end of the upstream hub 20 in order to accommodate a seat ring 28 adapted for seating engagement with a valve clapper 30. As shown, the clapper 30 is preferably a dished spherical section with a substantially radial edge 32 that engages with a complementary, frusto-conical surface 33 of the seat ring 28. Both frusto-conical surfaces 32 and 33 are preferably in a radial plane with respect to the sphere of which the clapper 30 is a section whereby sealing forces produced by the effects of fluid pressure acting against the convex surface of the clapper 30 are transmitted uniformly through the clapper to be transmitted directly to the frusto-conical surface 33 of the seat ring 28.

A chordal T-section 40 is welded to the clapper 30 so as to be engagable by a pig entering into the upstream hub 20 to cam the clapper into its elevated position shown in phantom in FIG. 1. The chord along which the cross-member 41 of the T-section extends commences a small arcuate distance from the upper edge of the clapper so as to present a somewhat greater angle of contact with an approaching pig.

Arms 42 welded to the clapper 30 are keyed to a shaft 44 which, in turn, is rotatably carried without lateral play in a bearing support member 46 welded to the inner surface of the main spherical body section 12. The axis of the shaft 44 is located above and slightly upstream of the valve seating surface 33 and, in addition, the spherical, dished configuration of the clapper disposes its center of gravity downstream of the valve seat sealing surface a sufficient distance to present a moment arm about the axis of the shaft 44, causing gravity to bias the clapper more firmly into closed position as shown. By mounting the shaft 44 in its support 46 without lateral play, impact between the two components, and consequential wear and damage thereto, is eliminated. Moreover, this enables a closely controlled relationship with external operators, indicators and the like (not shown).

Closely adjacent to and partially surrounding the valve seat, so as to partially embrace the valve clapper in closed position, is a partial sleeve liner 48 which tapers inward in frusto-conical configuration to merge with and form a continuation of the inner surface 22b of the downstream hub 22. As shown, the liner at the downstream end 50 is nearly a complete cylinder but is cut away at 52 to accommodate the clapper as it moves into its full open position, shown in phantom. Then, as it embraces the valve seat it is again extended around at 54 to more than 180° of the circumference of the valve seat 28. The liner 48 is preferably formed in two or three sections, each of which is inserted in place and radial adjustments are made if necessary until the liner is centered. Then the sections of the liner are welded together to form a complete unit.

A slot 56 of a size and configuration sufficient to permit installation of the valve clapper is cut into the top of the spherical section, and the top area is reinforced by the vertical cylindrical body extension 58. In completing the assembly of the valve, a top closure 60 is bolted at 62 to the vertical cylindrical body section 58 and may be fitted with a relief valve 64.

The Embodiment of FIG. 2

The seat ring assembly 28A illustrated in FIG. 2 includes a carrier ring 66 which is secured in the recess 26 of the hub 20 as by means of cap screws 68 spaced around the circumference thereof. Suitable means, such as an O-ring 69 carried on the carrier ring seals against leakage thereby.

Mounted on the carrier ring 66 for universal movement thereon, is a dynamic seat ring 70. Complementary spherical surfaces 72 and 74 on the carrier ring 66 and dynamic ring 70, which surfaces are generated about the common axis thereof, enable the dynamic ring 70 to yield against a spring 75, rotating about such axis to accommodate to the clapper 30, despite a limited misalignment therewith. In addition, the clearance 76 between the two rings enables a limited amount of radial movement of the dynamic sealing ring 70. A resilient O-ring 78 provides a seal between the carrier ring 66 and the sealing ring 70 and a resilient seal ring 80 is molded or bonded into a recess 82 in the face of the sealing ring 70 to effect a bubble-tight resilient seal.

The Embodiment of FIGS. 3 and 4

In the embodiment of FIGS. 3 and 4, the seat ring assembly 28B is retained within the recess 26 in the hub 20 by means of a segmented retainer ring 84, the segments of which are bolted to the hub 20, as by means of cap screws 86. Clearances 88 between the segmented retainer ring 84 and the seat ring 28B permit some movement in both radial and axial directions so that the conical surfaces 90 and 92 on the seat ring 28B and the clapper 30B will accommodate to each other. An O-ring 93 seals off the clearance 88 against leakage. The resilient main seal 94 which is molded in the face of the seat ring 28B is contained within a recess 96 below the surface 90 whereby, when in the open position shown in FIG. 4, a pig or other object can move through the seat ring 28B and across the conical surface 90 without scraping or impinging upon the resilient seal 94. This also protects the resilient seal 94 against any sediment that may be in the fluids passing through the line. Sealing engagement with the retracted seal 94 is accomplished by means of a raised seal ring 98 around the conical surface 92 of the clapper which extends into the recess 96 when the clapper is in its closed position shown in FIG. 3. The raised seal ring is displaced from the inner edge 99 of the clapper 30B so that when the clapper is in the open position shown in FIG. 1 any object moving down the pipeline will engage the inner edge 99 and tend to cam the objects away from the seal ring 98, thereby protecting the finished surface thereof.

The Embodiment of FIG. 5

In FIG. 5 the seat ring 28C is loosely retained in the recess 26 by means of flanged sleeves 100 secured to the hub 20 by cap screws 102. Clearances 104 around the sleeve 100 permit a limited amount of movement in both axial and radial directions for adjustment of the seat ring 28C to the clapper 30. A resilient seal 106 carried in the conical face 108 of the seat ring 28C provides a seal with the clapper 30 and, because the pivoted clapper tends to engage the seat ring 28C first at a location adjacent its pivotal axis 44 (FIG. 1) there is a tendency at low pressures for the clapper to hang up before it seals fully over its complete circumference. Hence, to compensate, the seal 106 is molded at an angle askew with respect to the axis of the flow passage, whereby it protrudes further at the lower portion of the seat ring 28C to allow complete resilient sealing engagement around the circumference of the seal ring 106 before the clapper moves into fully closed position against the conical surface 108.

The Embodiment of FIG. 6

In FIG. 6, the seat ring assembly 28D includes a seal ring 110 movably carried on a carrier ring 112 and the entire assembly is held in place in the recess on the hub 20 by means of a segmented retainer ring 114. Suitable seal means such as an O-ring 116 seals against leakage around the carrier ring 112. An O-ring 118 carried on the seal ring 110 seals against the inner cylindrical wall 120 of an annular recess 122 in which the seal ring 110 is movably mounted on the carrier ring 112. The seal ring 110 is biased axially outward into sealing engagement with the clapper by means of compression springs 124a and 124b spaced around the periphery thereof. The spring forces are augmented by fluid pressure acting against the back of the seal ring 110 radially inward as far as the O-ring 118 when the clapper is in closed position. In order to compensate for the tendency of the clapper to engage the seal ring 110 initially adjacent the pivotal axis of the clapper, the springs 124a at the top of the seat ring 28D are longer and, hence, weaker than those 124b at the bottom to enable a circumferentially uniform seal, even under a low pressure differential.

The Embodiment of FIG. 7

In FIG. 7, the tendency to engage at the upper end of the seat ring 28E is compensated for by an asymmetrical spacing of spring holes 130 with respect to the horizontal centerline, there being more springs on the lower half of the seat ring, away from the clapper pivot axis. Hence, the seat ring 28E is more yieldable in the area adjacent the pivot axis.

While this invention has been described in conjunction with preferred embodiments thereof, it is obvious that modifications and changes therein may be made by those skilled in the art without departing from the spirit and scope of this invention.

What is claimed as invention is:

1. In a swing check valve comprising:
   a housing having a pair of flow passageways therein;
   a valve clapper in said housing;
   means pivotally mounting said clapper in said housing adjacent one of said flow passageways;
   an annular sealing surface on said clapper;
   a seat ring floatingly mounted in said body around said one passageway for limited axial and radial movement therein;
   a complementary surface on said seat ring engagable by the sealing surface of said clapper;
   a resilient seal ring carried on the leading surface of said seat ring;
   means associated with said seat ring for providing yieldable sealing forces between said seal ring and said sealing surface when engaged, said means providing a lesser sealing force at portions of said seat ring adjacent said pivotable mounting and a greater sealing force at portions of the seat ring displaced therefrom; and
   retainer means holding said seat ring on said body.

2. The combination defined by claim 1 including:
   a carrier ring on said body having a complementary conical surface thereon;
   said seat ring being movably carried on said carrier ring;
   spring means biasing said seat ring outward of the conical surface on said carrier ring; and
   a second resilient seal ring carried on the inner surface of said seat ring and engaging said carrier ring.

3. The combination defined by claim 1 including:
   a carrier ring on said body around said one flow passageway;
   an external spherical surface on said carrier ring generated about a center on the axis thereof;
   a complementary internal spherical surface on said seat ring engaging on said external surface; and
   means sealing between said spherical surfaces.

4. The combination defined by claim 1 wherein said means providing yieldable sealing forces comprise:
   spring means engaging around said seat ring and biasing it outward in sealing engagement with said clapper in closed position;
   certain of said spring means engaging that portion of said seat ring adjacent said pivotal mounting means asserting less spring force than other spring means at portions of said seat ring displaced therefrom.

5. The combination defined by claim 4 wherein:
   said certain spring means are weaker than said other spring means.

6. The combination defined by claim 4 wherein:
   said certain spring means are spaced farther apart than said other spring means.

7. The combination defined by claim 1 wherein said means providing yieldable sealing forces comprise:
   the resilience of said seal ring;
   said resilient seal ring being carried on said complementary surface to protrude therefrom;
   the leading surface of said resilient seal ring being disposed in a plane which is not normal to the axis of said seat ring whereby the portion of the circumference thereof diametrically opposite said pivotal mounting protrudes furthest from said complementary conical surface.

* * * * *